(12) United States Patent
Chandra et al.

(10) Patent No.: US 9,769,843 B2
(45) Date of Patent: Sep. 19, 2017

(54) METHOD AND APPARATUS FOR TRANSMITTING, RECEIVING AND/OR PROCESSING CONTROL INFORMATION AND/OR DATA

(71) Applicant: InterDigital Technology Corporation, Wilmington, DE (US)

(72) Inventors: Arty Chandra, Manhasset Hills, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 33 days.

(21) Appl. No.: 14/721,980

(22) Filed: May 26, 2015

(65) Prior Publication Data
US 2015/0334736 A1 Nov. 19, 2015

Related U.S. Application Data

(63) Continuation of application No. 13/477,697, filed on May 22, 2012, now Pat. No. 9,078,279, which is a (Continued)

(51) Int. Cl.
*H04W 4/00* (2009.01)
*H04W 72/12* (2009.01)
(Continued)

(52) U.S. Cl.
CPC ....... *H04W 72/1278* (2013.01); *H04L 1/0025* (2013.01); *H04L 1/0026* (2013.01);
(Continued)

(58) Field of Classification Search
CPC .......... H04W 72/1278; H04W 72/0406; H04L 5/0055; H04L 1/0026; H04L 1/1812; H04L 1/0025; H04L 1/1671
See application file for complete search history.

(56) References Cited

U.S. PATENT DOCUMENTS 5,870,685 A 2/1999 Flynn
6,757,270 B1 6/2004 Kumar et al.
(Continued)

FOREIGN PATENT DOCUMENTS

CN 1488206 4/2004
CN 1647439 7/2005
(Continued)

OTHER PUBLICATIONS

"Japanese Decision to Grant", Japanese Application No. 2011-117333, Sep. 2, 2011, 3 pages.
(Continued)

*Primary Examiner* — Afshawn Towfighi
(74) *Attorney, Agent, or Firm* — Julian F. Santos

(57) ABSTRACT

A method and system for providing control information for supporting high speed downlink and high speed uplink packet access are disclosed. A Node-B assigns at least one downlink control channel and at least one uplink control channel to a wireless transmit/receive unit (WTRU). The downlink control channel and the uplink control channel are provided to carry control information for both the downlink and the uplink. Conventional control channels, for downlink and uplink are combined into a reduced set of control channels for uplink and downlink. The Node-B and the WTRU communicate control information via the downlink control channel and the uplink control channel. The WTRU receives downlink data and transmits uplink data, and the Node-B receives uplink data and transmits downlink data based on the control information transmitted via the downlink control channel and the uplink control channel.

20 Claims, 2 Drawing Sheets

Related U.S. Application Data continuation of application No. 11/538,547, filed on Oct. 4, 2006, now abandoned.

(60) Provisional application No. 60/725,064, filed on Oct. 7, 2005.

(51) Int. Cl.
   *H04L 5/00* (2006.01)
   *H04L 1/00* (2006.01)
   *H04L 1/18* (2006.01)
   *H04W 72/04* (2009.01)
   *H04L 1/16* (2006.01)

(52) U.S. Cl.
   CPC ......... *H04L 1/1812* (2013.01); *H04L 5/0055* (2013.01); *H04W 72/0406* (2013.01); *H04L 1/1671* (2013.01)

(56) References Cited

U.S. PATENT DOCUMENTS

| | | | |
|---|---|---|---|
| 8,494,063 | B1 | 7/2013 | Reudink |
| 2002/0141367 | A1 | 10/2002 | Hwang et al. |
| 2002/0168994 | A1 | 11/2002 | Terry et al. |
| 2002/0172217 | A1 | 11/2002 | Kadaba et al. |
| 2003/0045288 | A1 | 3/2003 | Luschi et al. |
| 2003/0064728 | A1 | 4/2003 | Speight |
| 2003/0108013 | A1 | 6/2003 | Hwang et al. |
| 2003/0123396 | A1 | 7/2003 | Seo et al. |
| 2003/0202511 | A1 | 10/2003 | Sreejith et al. |
| 2003/0207696 | A1 | 11/2003 | Willenegger et al. |
| 2003/0224798 | A1 | 12/2003 | Willenegger et al. |
| 2003/0232622 | A1 | 12/2003 | Seo et al. |
| 2004/0085924 | A1 | 5/2004 | Zhang et al. |
| 2004/0125766 | A1 | 7/2004 | Takano et al. |
| 2004/0252689 | A1 | 12/2004 | Park et al. |
| 2005/0068990 | A1* | 3/2005 | Liu .................. H04J 3/0682 370/516 |
| 2005/0073985 | A1 | 4/2005 | Heo et al. |
| 2005/0117559 | A1 | 6/2005 | Malladi et al. |
| 2005/0163071 | A1* | 7/2005 | Malladi .............. H04J 13/00 370/328 |
| 2005/0180449 | A1 | 8/2005 | Ranta-Aho et al. |
| 2005/0220042 | A1 | 10/2005 | Chang et al. |
| 2005/0232181 | A1 | 10/2005 | Park et al. |
| 2005/0238053 | A1 | 10/2005 | Iochi et al. |
| 2005/0265301 | A1 | 12/2005 | Heo |
| 2005/0277419 | A1 | 12/2005 | Takano et al. |
| 2006/0003767 | A1 | 1/2006 | Kim et al. |
| 2006/0035643 | A1* | 2/2006 | Vook .................. H04L 5/0094 455/450 |
| 2007/0081498 | A1* | 4/2007 | Niwano ............... H04W 72/10 370/335 |
| 2007/0173269 | A1 | 7/2007 | Laroia et al. |
| 2007/0275728 | A1 | 11/2007 | Lohr et al. |
| 2008/0014969 | A1 | 1/2008 | Laroia et al. |
| 2008/0032633 | A1 | 2/2008 | Harrison |
| 2008/0253300 | A1 | 10/2008 | Wakabayashi et al. |
| 2008/0254819 | A1 | 10/2008 | Niwano et al. |
| 2008/0311892 | A1 | 12/2008 | Lee et al. |

FOREIGN PATENT DOCUMENTS

| | | |
|---|---|---|
| EP | 1418786 | 5/2004 |
| EP | 1871028 | 12/2007 |
| EP | 1500220 | 1/2008 |
| JP | 11-513868 | 11/1999 |
| JP | 2002-369261 | 12/2002 |
| JP | 2004-343258 | 12/2004 |
| JP | 2007-221178 | 8/2007 |
| JP | 2012-120186 | 6/2012 |
| RU | 2222117 | 1/2004 |
| RU | 2242091 | 12/2004 |
| TW | 200518109 | 6/2005 |
| WO | WO-97/16039 | 5/1997 |
| WO | WO-99/53629 | 10/1999 |
| WO | WO-01/26269 | 4/2001 |
| WO | WO-03/085878 | 10/2003 |
| WO | WO-2004/017578 | 2/2004 |
| WO | WO-2005/017579 | 2/2005 |
| WO | WO-2005/036913 | 4/2005 |
| WO | WO-2005/050852 | 6/2005 |
| WO | WO-2005/088869 | 9/2005 |

OTHER PUBLICATIONS

"Japanese Decision to Grant (English Translation)", Japanese Application No. 2011-117333, Sep. 2, 2011, 3 pages.
"Japanese Notice of Rejection", Japanese Application No. 2011-285921, May 2, 2012, 3 pages.
"Japanese Notice of Rejection (English Translation)", Japanese Application No. 2011-285921, May 2, 2012, 3 pages.
"Russian Decision of Grant", Russian Application No. 2008118160, Nov. 10, 2009, 8 pages.
"Russian Decision of Grant (English Translation)", Russian Application No. 2008118160, Nov. 10, 2009, 4 pages.
"3rd Generation Partnership Project; Technical Specification Group Radio Access Network; 3.84 Mcps TDD Enhanced Uplink; RAN WG2 Stage 2 Decisions (Release 7)", 3GPP TR 30.301 V0.1.1, Aug. 2005, 25 pages.
"3rd Generation Partnership Project; Technical Specification Group Radio Access Network; Physical Channels and Mapping of Transport Channels onto Physical Channels (TDD) (Release 6)", 3GPP TS 25.221 V6.5.0, Sections 4 to 4.1.2.7 and 6 to 6.2.7.2, Sep. 2005, 100 pages.
"Extended European Search Report", EP Application No. 14188745.5, Jan. 27 2015, 8 pages.
"Japanese Notice of Rejection", Japanese Application No. 2012-165142, Nov. 26, 2013, 3 pages.
"Japanese Notice of Rejection (English Translation)", Japanese Application No. 2012-165142, Nov. 26, 2013, 4 pages.
"Japanese Office Action", Japanese Application No. 2012-165142, Mar. 5, 2013, 2 pages.
"Japanese Office Action (Translation)", Japanese Application No. 2012-165142, Mar. 5, 2013, 2 pages.
"Korean Office Action", Korean Application No. 10-2013-7028136, Aug. 22, 2014, 3 pages.
"Korean Office Action (English Translation)", Korean Application No. 10-2013-7028136, Aug. 22, 2014, 3 pages.
"Russian Decision of Grant", Russian Patent Application No. 2009147836, Oct. 3, 2014, 12 pages.
"Russian Decision of Grant (English Translation)", Russian Patent Application No. 2009147836, Oct. 3, 2014, 7 pages.
"Taiwanese Examination Notification", Taiwan Patent Application No. 096114327, Nov. 21, 2012, 5 pages.
"Taiwanese Examination Notification (Translation)", Taiwan Patent Application No. 096114327, Nov. 21, 2012, 4 pages.
"Taiwanese Examination Notification", Taiwanese Application No. 102121631, Apr. 2, 2015, 6 pages.
"Taiwanese Examination Notification English Translation", Taiwanese Application No. 102121631, Apr. 2, 2015, 5 Pages.
"Taiwanese Examination of Communication", Taiwanese Patent Application No. 096114327, Sep. 26, 2013, 5 pages.
"Taiwanese Examination of Communication (English Translation)", Taiwanese Patent Application No. 096114327, Sep. 26, 2013, 4 pages.
"Taiwanese Office Action", Taiwanese Application No. 098135682, Sep. 30, 2013, 4 pages.
"Taiwanese Office Action (English Translation)", Taiwanese Patent Application No. 098135682, Sep. 30, 2013, 3 pages.
U.S. Appl. No. 11/538,547.
U.S. Appl. No. 13/477,697.
"Universal Mobile Telecommunications System (UMTS); UTRA High Speed Downlink Packet Access (HSDPA); Overall description; Stage 2 (3GPP TS 25.308 version 6.3.0 Release 6)", 3GPP TS 25.308 V6.3.0, Dec. 2004, 28 pages.

(56) References Cited

OTHER PUBLICATIONS

Ericsson, "Associated downlink signaling", 3GPP Tdoc 12A010059, 3GPP TSG-RAN WG1/2 HSDPA Ad-Hoc, Sophia Antipolis, France, Nov. 5, 2001, 6 pages.
Ericsson, "E_UTRA Uplink Radio Access", 3GPP Tdoc R1-050620 TSG-RAN WG1 AdHoc on LTE, Sophia Antipolis, France, Jun. 20-21, 2005, 5 Pages.
Samsung, "Data and Control Multiplexing in DFT-S-OFDM", 3GPP Tdoc R1-051039, 3GPP TSG RAN WG1 Meeting #42bis, San Diego, CA, USA, Oct. 10-14, 2005, 5 Pages.
Samsung, "Uplink Transmission and Multiplexing for EUTRA", 3GPP Tdoc R1-050605, 3GPP TSG RAN WG1 AD HOC on LTE Sophia-Antipolis, France, Samsung, Jun. 20-21, 2005, 6 pages.
Siemens, "HSDPA Signalling Requirements for TDD Mode", 3GPP Tdoc R2-010715, 3GPP TSG-RAN Working Group2 meeting 19, Sophia Antipolis, Feb. 19-23, 2001, 7 pages.
Siemens, "Signalling Requirements for HSDPA in TDD Mode", 3GPP Tdoc 12A010010, 3GPP TSG RAN WG1/2 Joint Meeting on HSDPA, Sophia Antipolis, France, Apr. 5-6, 2001, 3 pages.
"Chinese Office Action", Chinese Application No. 201310454836.4, Apr. 13, 2016, 5 pages.
"Chinese Office Action (English Translation)", Chinese Application No. 201310454836.4, Apr. 13, 2016, 7 pages.
Communication under Rule 71(3) EPC and Text intended for Grant, European Patent Application No. 14 188 745.5-1854, Mar. 22, 2017, 26 pages.

* cited by examiner

METHOD AND APPARATUS FOR TRANSMITTING, RECEIVING AND/OR PROCESSING CONTROL INFORMATION AND/OR DATA

CROSS REFERENCE TO RELATED APPLICATION

This application is a continuation of U.S. patent application Ser. No. 13/477,697 filed May 22, 2012, which is a continuation of U.S. patent application Ser. No. 11/538,547 filed Oct. 4, 2006, which claims the benefit of U.S. Provisional Application No. 60/725,064 filed Oct. 7, 2005; each of which is incorporated by reference as if fully set forth herein.

FIELD OF INVENTION

The present invention is related to a wireless communication system. More particularly, the present invention is related to a method and system for providing control information for supporting high speed downlink and uplink.

BACKGROUND

The third generation partnership project (3GPP) releases 5 and 6 provide HSDPA and HSUPA for high speed transmissions in the downlink and uplink, respectively. For HSDPA and HSUPA operations, a Node-B dynamically allocates radio resources to a plurality of user equipments (UEs), and several physical channels are provided to the UEs.

There are two downlink physical channels and one uplink physical channel in HSDPA. The downlink physical channels include a high speed shared control channel (HS-SCCH) and a high speed physical downlink shared channel (HS-PDSCH). The uplink physical channel includes a high speed dedicated physical control channel (HS-PDCCH).

The HS-SCCH carriers downlink HSDPA control information. The downlink HSDPA control information includes a channelization code set, a modulation scheme, a transport block size, hybrid automatic repeat request (H-ARQ) process information, redundancy and constellation version, a new data indicator and a UE identity (ID). A UE is assigned with up to four (4) HS-SCCHs in a cell via radio resource control (KEG) signaling. The UE needs to monitor all of the allocated HS-SCCH(s) before receiving control information for HSDPA.

The HS-PDSCH carriers downlink HSDPA data packets. Based on the processing of the HS-PDSCH, (e.g., cyclic redundancy check (CRC) and H-ARQ processing), the UE sends a positive acknowledgement (ACK) or a negative acknowledgement (NACK) signal to the Node-B via the HS-DPCCH. The HS-DPCCH also carries a channel quality indicator (CQI).

There are three downlink physical channels and two uplink, physical channels in HSUPA. The downlink physical channels include an enhanced dedicated channel (E-DCH) absolute grant channel (E-AGCH), an E-DCH relative grant channel (E-RGCH), and an E-DCH H-ARQ indicator channel (E-HICH). The uplink physical channels include an E-DCH dedicated physical data channel (E-DPDCH) and an E-DCH dedicated physical control channel (E-DPCCH).

The E-AGCH carries an uplink E-DCH absolute grant, (i.e., a maximum power ratio between the E-DPDCH and a dedicated physical control channel (DPCCH)). The channelization code for the E-AGCH is signaled separately to each UE. The E-RGCH carries an uplink E-DCH relative grant. The E-HICH carries an E-DCH H-ARQ acknowledgement indicator, (i.e., ACK or NACK). The E-DPDCH carries uplink HSUPA data packets. The E-DPCCH carries transport format combination index (TFCI) information, a retransmission, sequence number (RSN) and a happy bit.

The following Tables 1 and 2 summarize the control information sent on the downlink for HSDPA and HSUPA, respectively, and the following Tables 3 and 4 summarize the control information sent on the uplink for HSDPA and HSUPA, respectively.

TABLE 1

| Information (number of bits) | When | Frequency |
| --- | --- | --- |
| Shared control channel (SCCH) | | |
| Channelization code (7) | Before data transmission | Per TTI |
| Modulation (1) | Before data transmission | Per TTI |
| Transport block size (6) | Before data transmission | Per TTI |
| H-ARQ process information (3) | Before data transmission | Per TTI |
| Redundancy version (3) | Before data transmission | Per TTI |
| New data indicator (1) | Before data transmission | Per TTI |
| UE ID (16) | Before data transmission | Per TTI |

TABLE 2

| Information (number of bits) | When | Frequency |
| --- | --- | --- |
| Absolute Grant Channel (E-AGCH) | | |
| Absolute grant - in terms of power ratio (5) | After rate request | Depends on the implementation (100's of ms) |
| UE ID or group of UE (16) | After rate request | Same as above |
| H-ARQ process activation flag | After rate request | Same as above |
| Relative Grant Channel (E-RGCH) From serving cells | | |
| UP/Hold/Down | Following UL transmission | Per TTI |
| From non-serving cell | | |
| Hold/Down (1) | Following UL transmission | Per TTI (only for 'down' command) |
| UE ID (16) | Following UL transmission | Per TTI (only for 'down' command) |
| H-ARQ Indicator Channel (E-HICH) | | |
| ACK/NACK (1) | Following UL transmission | Per TTI |

TABLE 3

| Information (number of bits) | When | Frequency |
| --- | --- | --- |
| Dedicated Control Channel (HS-DPCCH) | | |
| ACK/NACK (1) | Following DL transmission | Per TTI |
| CQI (5) | Following DL transmission | Periodic (multi TTI or 160 msec as soon as HSDPA channel is est. |

TABLE 4

| Information (number of bits) | When | Frequency |
| --- | --- | --- |
| E-DCH Dedicated Control Channel (E-DPCCH) | | |
| RSN (2) | With UL data transmission | Per TTI |
| Happy bit (1) | With UL data transmission | Per TTI |
| E-TFCI (7) | With UL data transmission | Per TTI |
| Rate Request Information (on E-DPDCH) | | |
| Logical channel ID (4) | | Periodic and event triggered defined by RRC |
| UE buffer occupancy (13) | | Periodic and event triggered defined by RRC |
| UE Power headroom (7) | | Periodic and event triggered defined by RRC |

SUMMARY

The present invention is related to a method and system for providing control information for supporting high speed data transmission. A Node-B assigns at least one downlink control channel and at least one uplink control channel to a wireless transmit/receive unit (WTRU). The downlink control channel and the uplink control channel are provided to carry control information for both the downlink and the uplink data transmission. Conventional control channels for HSDPA and HSUPA are combined into a reduced set of control channels for uplink and downlink. The Node-B and the WTRU communicate control information via the reduced set of downlink control and the uplink control channels. The WTRU receives downlink data and transmits uplink data, and the Node-B receives uplink data and transmits downlink data based on the control information transmitted via the reduced set of downlink control and the uplink control channels.

DETAILED DESCRIPTION OF THE PREFERRED EMBODIMENTS

When referred to hereafter, the terminology "WTRU" includes but is not limited to a user equipment (UE), a mobile station (STA), a fixed or mobile subscriber unit, a pager, or any other type of device capable of operating in a wireless environment. When referred to hereafter, the terminology "Node-B" includes but is not limited to a base station, e-Node-B, a site controller, an access point (AP) or any other type of interfacing device in a wireless environment.

The features of the present invention may be incorporated into an integrated circuit (IC) or be configured in a circuit comprising a multitude of interconnecting components.

In the current 3GPP specification, there are four downlink control channels and two uplink control channels are defined to support HSDPA and HSUPA operation. In accordance with the present invention, the conventional two uplink control channels are combined to at least one uplink control channel and the conventional four downlink control channels are combined to at least one downlink control channel. In addition to these control channels used for high speed uplink and downlink, information signaled on associated dedicated control channels, (e.g., transmit power control (TPC) on uplink and downlink DPCCHs), may also be combined.

Figure 1:
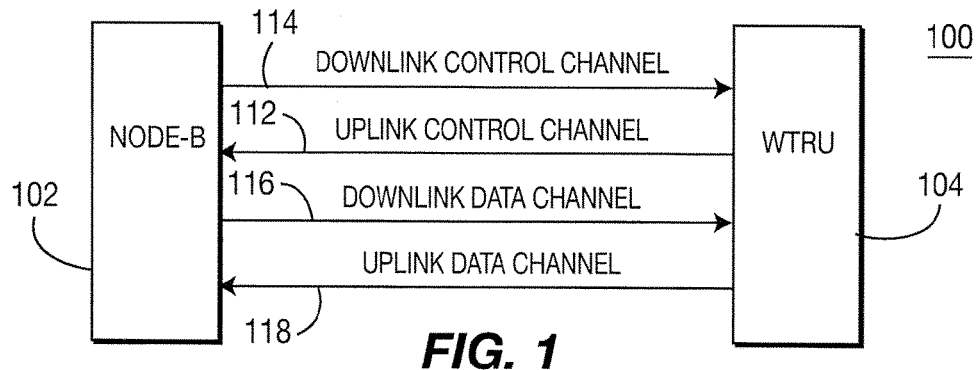
FIG. 1 is a block diagram of a system configured in accordance with the present invention.

FIG. 1 is a block diagram of a wireless communication system 100 configured in accordance with the present invention. The system 100 includes a Node-B 102 and a WTRU 104. Between the Node-B 102 and the WTRU 104, an uplink control channel 112, a downlink control channel 114, a downlink data channel 116 and an uplink data channel 118 are established. The channels 112-118 are allocated to the WTRU 104 preferably by the Node-B 102 or a radio network controller (RNC). The channels 112-118 may be defined by a combination of at least one of frequency, time, power, antenna, and code. A certain antenna and power may be used to transmit to one user and a different set of antenna and power may be used to transmit to another user. Hence, multiple channels may be available at the same time on the same frequency and code using different antenna and power. The Node-B 102 may configure the WTRU 104 to receive and transmit on more than one downlink and uplink control channel and more than one downlink and uplink data channel.

The WTRU 104 listens to the downlink control channel 114 and gets control Information about the downlink data channel, the uplink control channel and the uplink data channel. Once the WTRU 104 is configured with the uplink control channel 112 and the downlink data channel 116, the WTRU 104 receives data or transmits control and data information on the assigned downlink data channel 116, the uplink control channel 112 and the uplink data channel 118.

The control information may include scheduling information, packet decoding information, receive process information and feedback information. The packet decoding information, receive process information and feedback information need to be transmitted every transmission time interval (TTI). The scheduling information may be transmitted every TTI or on a need basis.

The packet decoding information may include modulation scheme, a coding rate and a packet size. The information regarding the modulation scheme, the coding rate and the packet size may be combined into one parameter for over the air transmission.

The receive process information may include an H-ARQ process ID, a new data indicator, a redundancy version, a packet sequence number and status information of a transmitter. The H-ARQ process ID is needed only for asynchronous H-ARQ and is not needed for synchronous H-ARQ. The redundancy version may be used to indicate new data as well. The packet sequence number denotes the sequence number of a packet within, an H-ARQ process at the transmitter. This is a useful parameter for soft or hard combining of retransmission and a previously failed transmission. The status information may be used for H-ARQ assisted ARQ operation where along with H-ARQ feedback information indicating the status of on-going transmission may be reported.

The feedback information may include H-ARQ ACK/NACK, a CQI of the control channel, a CQI of the data channel, a packet sequence number, an H-ARQ process ID, status information of a receiver, transmit diversity information (phase and amplitude information to support transmit diversity), and power control information.

The scheduling information is either a scheduling request or a scheduling response. The scheduling response is sent from the Node-B 102 to the WTRU 104, and the scheduling request is sent from the WTRU 104 to the Node-B 102. The scheduling response may include at least one of resource allocation for a secondary downlink control channel (if applicable), resource allocation for the downlink data channel 116, resource allocation for the uplink control channel 112, resource allocation for the uplink data channel 118 and uplink timing adjustment if necessary. The secondary downlink control channel is a control channel dedicated to a WTRU 104 for point-to-point point services and possibly to several WTRUs in the case of point-to-multipoint services. The WTRU 104 listens to and decodes the channel following a resource allocation indicating the secondary control channel. The WTRU 104 needs frame alignment timing to transmit correctly in an uplink slot. Since a clock of the WTRU 104 drifts with time and the propagation delay changes due to mobility, the WTRU 104 needs to adjust its clock based on the feedback from the Node-B 102. This information is signaled whenever the Node-B 102 detects reception outside of a specified range.

In conventional 3GPP standards, radio resources are assigned per TTI for HSDPA and indefinitely for HSUPA. A duration field may be added to provide flexibility in assigning radio resources so that each resource allocation includes physical resource allocation information and duration indicating a period during which the physical resource allocation is effective. Duration may be a continuous allocation of certain TTIs to the WTRU 104, or a periodic allocation of resources for a certain time. For example, the duration field may be denoted by "n" TTI where "n" may have value from 1 to infinity. The value of '1' indicates the resource is assigned for one TTI and the value of "infinity" denotes infinite allocation of the resource. Where resources are assigned for an infinite period, the WTRU 104 is informed explicitly about release of the resources.

The scheduling response may be sent separately on the downlink control channel 114. Alternatively, the scheduling response may be multiplexed in a signal packet with at least one of the packet decoding information, the receive process information and the feedback information. Alternatively, the scheduling response may be piggybacked with a data packet and sent on the downlink data channel 116.

Alternatively, two separate downlink control channels may be allocated to the WTRU 104, (i.e., a primary downlink control channel and a secondary downlink control channel), and the scheduling response may be transmitted via the primary downlink control channel and the other control information, (i.e., packet decoding information, receive process information, timing adjustment and feedback information), may be transmitted via the secondary downlink control channel. It is preferable to share the primary downlink control channel with multiple WTRUs and dedicate the secondary downlink control channel to a single WTRU for point-to-point services or a set of WTRUs for point-to-multipoint services. The primary downlink control channel is a common control channel that all WTRUs are listening on. The secondary control channel is a dedicated control channel that only certain WTRU(s) addressed on the particular primary control channel listens for.

The scheduling request may contain all or some of the following information such as buffer occupancy for each service type or data flow, related quality of service (QoS) requirements, time in the queue for the first packet for each service, and the WTRU power headroom, (i.e., available power for the requested uplink resource channel). The scheduling request may be transmitted separately on the uplink control channel 112, may be piggybacked with other control information and transmitted on the uplink control channel 112, may be piggybacked with uplink data and transmitted, on the uplink data channel 118, may be sent via a separate packet an the uplink data channel 118, or may be sent via a random access channel (RACH) (not shown in FIG. 1). Preferably, during active transmission, (i.e., the uplink control channel 112 is present), the scheduling request is sent on the uplink control channel 112 piggybacked with the other control information. In the absence of the uplink control channel 112, the scheduling request is preferably sent on the RACH.

For transmitting control information on the uplink control channel 112 and the downlink control channel 114, the control information may be separated in two parts since not all the control information needs to be sent at any given TTI. The control information may contain special bits to indicate whether the control channel contains only downlink control information or only uplink control information and whether the control channel contains feedback information or other control information. The special bits may also indicate whether the control channel includes broadcast information, multimedia broadcast/multicast services (MBMS), persistent scheduling information for periodic services, paging information or control information for group of WTRUs.

Uplink control information from the Node-B 102 to the WTRU 104 may contain transmission feedback information. Downlink control information from the WTRU 104 to the Node-B 102 only contains feedback information. Uplink control Information from the WTRU 104 to the Node-B 102 contains packet decoding information, receive process information and a scheduling request (if needed). Downlink control information from the Node-B 102 to the WTRU 104 contains decoding information, receive process information and a schedule response (if needed).

In a preferred embodiment, a single packet may be used including all control Information. Alternatively, multiple packets may be used. A single packet contains all the downlink control information and the uplink control information needed for both, downlink and uplink. The control packet contains decoding information, receive process information, feedback information and scheduling information, (i.e., a scheduling request or a scheduling response). Some indication may be included in the control packet to indicate active information elements.

The downlink control channel 114 and the uplink control channel 112 may be a shared channel for all WTRUs or a dedicated channel assigned to a single WTRU or a group of WTRUs. Preferably, the uplink control channel 112 is not a shared channel due to possible collisions between multiple WTRUs.

The uplink control channel 112 may be assigned to a WTRU 104 only during active uplink and/or downlink data transfer, (i.e., on an as needed basis). Alternatively, the uplink control channel 112 may be assigned to a WTRU 104 even in a dormant state. Four alternatives with respect to downlink and uplink control channel configuration are summarized in Table 5. Method 3 and 4 are the preferred alternatives.

TABLE 5

| | Downlink control channel | Uplink control channel |
|---|---|---|
| Method 1 | Dedicated | Dedicated during dormant and active state |
| Method 2 | Dedicated | Dedicated only during active state |
| Method 3 | Shared | Dedicated during dormant and active state |
| Method 4 | Shared | Dedicated only during active state |

Figure 2:
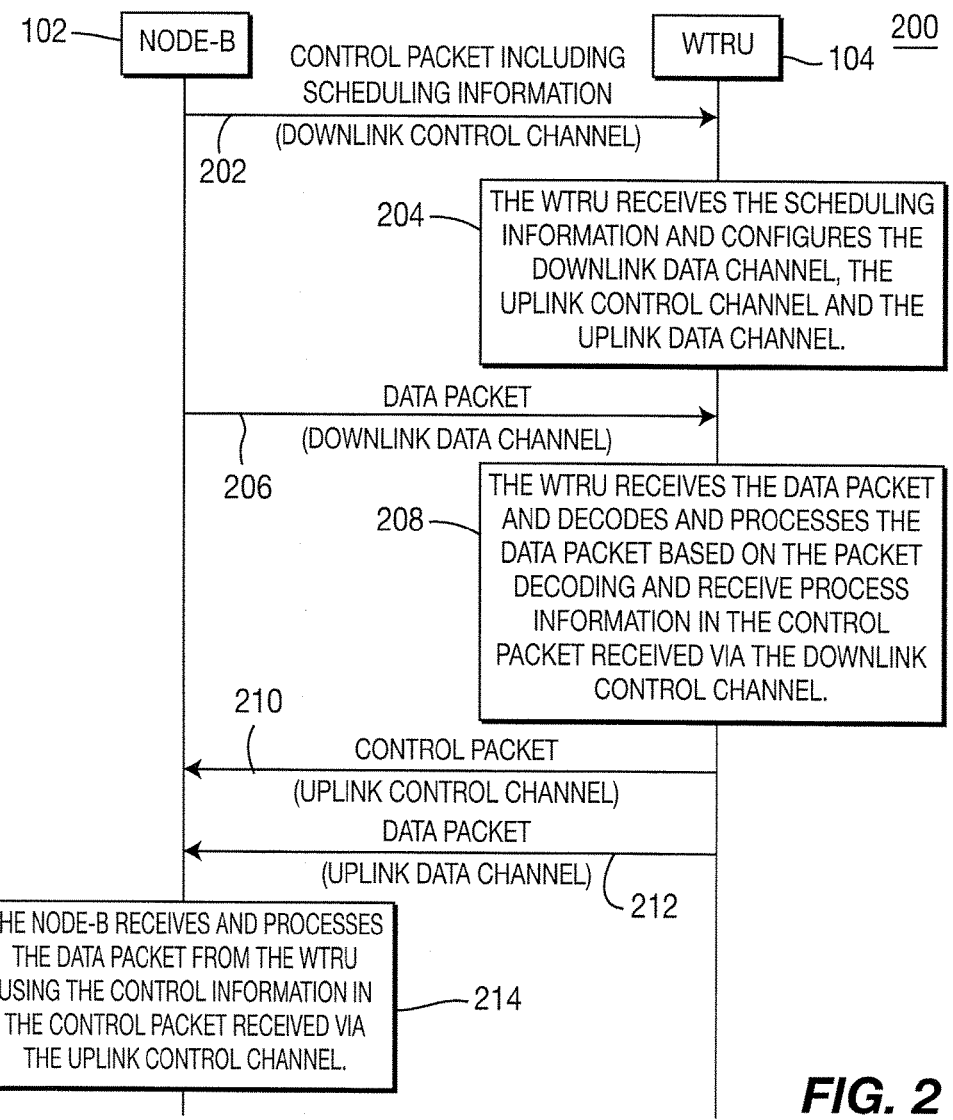
FIG. 2 is a flow diagram of an exemplary process for transmission of control and data packets in accordance with, one embodiment of the present invention.

An exemplary system operation with a single downlink control channel and per TTI basis resource allocation is explained hereinafter with reference to FIG. 2. FIG. 2 is a flow diagram of an exemplary process 200 for transmission of control and data packets in accordance with one embodiment of the present invention. The WTRUs are listening to the downlink control channel 114 (step 202). Once the WTRUs 104 get the control information addressed to it on the downlink control channel 114 from a Node-B 102, the WTRUs 114 get scheduling information, (e.g., resource allocation for a downlink data channel, an uplink control channel and an uplink data channel), and packet decoding and receive process information, (e.g., a coding rate, a modulation scheme, a packet size, an H-ARQ process ID, a redundancy version, or the like). The control packet may also include feedback information, (i.e., H-ARQ ACK/NACK of the previous uplink data packet and a CQI). The WTRU 104 receives the scheduling information and configured the downlink data channel 116, the uplink control channel 112 and the uplink data channel 118 (step 204).

The None-B 102 transmits a downlink data packet to the WTRU 104 via the downlink data channel 116 (step 206). The WTRU 104 receives the downlink data packet on the downlink data channel 116 and decodes and processes the data packet based on the packet decoding and receive process information received in the control packet via the downlink control channel 114 (step 208).

The WTRU 104 responds with a control packet that contains feedback information to the downlink data packet, (i.e., ACK/NACK) (step 210). If needed, the WTRU 104 may also send a scheduling request for uplink transmission and packet decoding and receive process information, (i.e., a coding rate, a modulation scheme, a packet size, an H-ARQ process ID, a redundancy version, or the like), and may subsequently send an uplink data packet (steps 210, 212). The Node-B 102 receives and processes the uplink data packet from the WTRU 104 using the control information in the control packet received via the uplink control channel (step 214).

Figure 3:
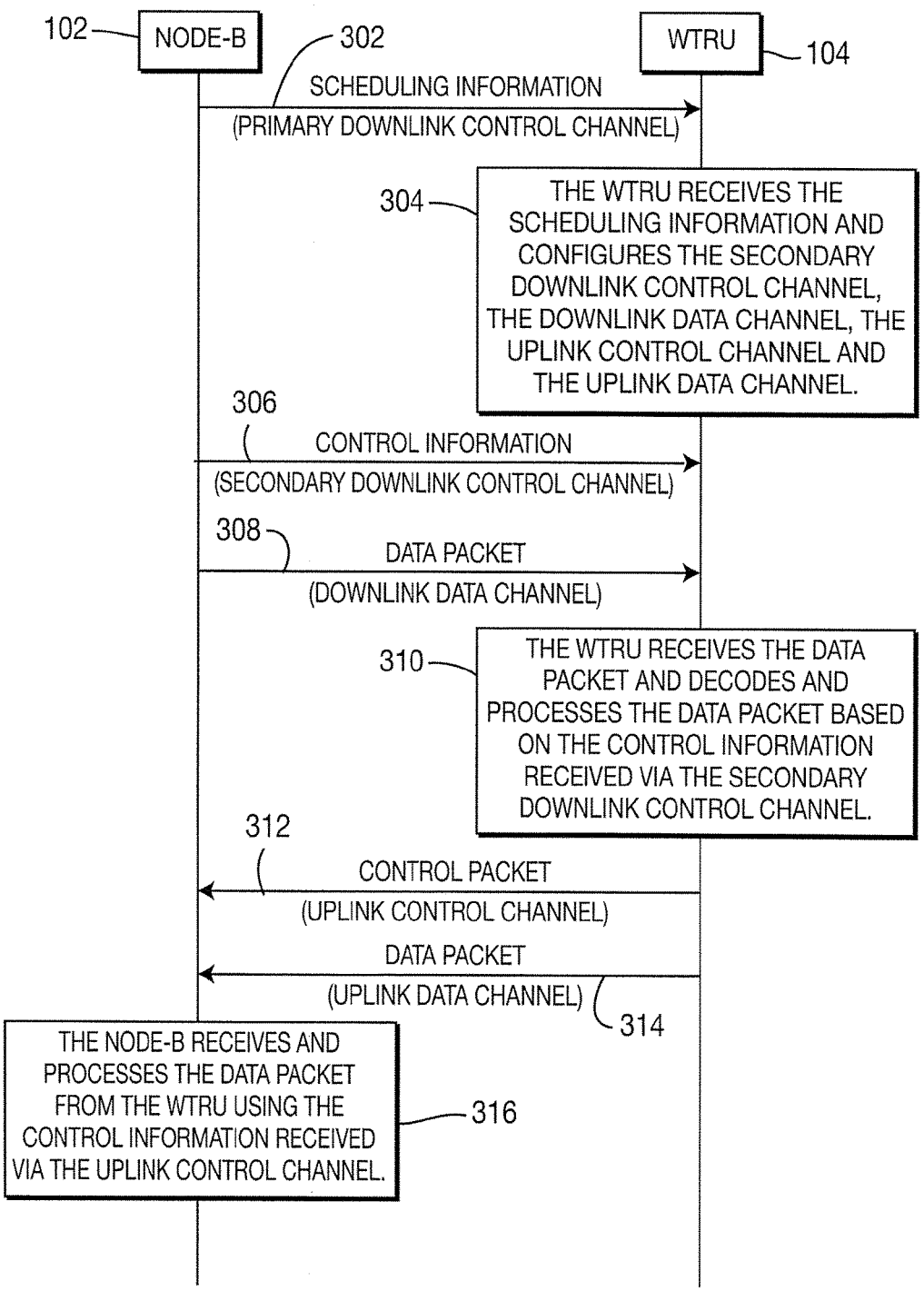
FIG. 3 is a flow diagram of an exemplary process for transmission of control and data packets in accordance with another embodiment the present invention.

An exemplary system, operation with primary and secondary downlink control channels and duration-based resource allocation is explained herein after with reference to FIG. 3. FIG. 3 is a How diagram of an exemplary process 300 for transmission of control and data packets in accordance with another embodiment of the present invention. Two downlink control channels, (i.e., a primary downlink control channel and a secondary downlink control channel). The primary control channel, (may also be called a common control channel), is known to and monitored by each WTRU 104. Each WTRU 104 receives control information on the primary channel addressed to it from the Node-B 102, The Node-B 102 sends scheduling information on the primary downlink control channel (step 302). The scheduling information includes resource assignment for a secondary downlink control channel, a downlink data channel, an uplink control channel and an uplink data channel. The secondary downlink control channel is the dedicated control channel addressed to the WTRU 104. Upon receiving the scheduling information, the WTRU 104 configures the secondary downlink control channel, the downlink data channel, the uplink control channel and the uplink data channel (step 304).

The Node-B 102 sends control information, (i.e., packet related information, such as a coding rate, a modulation scheme, a packet size, an H-ARQ process ID, a redundancy version, or the like), on the secondary downlink control channel (step 306). The Node-B 102 may send feedback information, (i.e., ACK/NACK of the previous uplink data packet and a CQI), on the secondary downlink control channel. The Node-B 102 then sends a data packet to the WTRU 104 via the downlink data channel (step 308). The WTRU 104 decodes and processes the data packet based on the control information received on the secondary downlink control channel (step 310). The WTRU 104 sends a control packet that contains feedback information to the data packet, (i.e., ACK/NACK), via the uplink control channel (step 312). If needed, the WTRU 104 may send a scheduling request for uplink transmissions and packet related information along with the feedback via the uplink control channel. The WTRU 104 then may send an uplink data packet via the uplink data channel (step 314). The Node-B 102 receives, decodes and processes the uplink data packet based on the control information received via the uplink control channel (step 316). If the primary control channel allocates a secondary control and data transmission channel for a specified duration the WTRU 104 either continuously, (i.e., each TTI), or periodically, (i.e., in accordance with a reception pattern over multiple TTIs), receive the allocated channels for the duration of the allocation.

An H-ARQ control packet for an active H-ARQ process may be sent on an as needed basis. If the H-ARQ information, (such as an H-ARQ process ID, a new data indicator and a redundancy version), is included in a subsequent packet, (e.g., in a header of a subsequent data packet), there is no need to send the scheduling information every TTI. A downlink control packet for scheduling information will be sent only if there is a change in resource allocation, a modulation scheme or a packet size.

The control information may be piggybacked on a data packet. Control information, (such as, ACK/NACK, a CQI, a scheduling response, or a scheduling request), may be piggybacked with data in a data packet. This is especially useful when both uplink and downlink H-ARQ processes are active. A downlink data-packet may piggyback ACK/NACK, a CQI and a scheduling response. An uplink data packet may piggyback ACK/NACK, a CQI and a scheduling request.

Alternatively, two uplink control channels may be provided, (i.e., a primary uplink control channel and a secondary uplink control channel). The primary uplink control channel is used to send a resource request and the secondary control channel is used to send packet decoding and receive process information and feedback information.

Downlink resource allocation may implicitly imply uplink resource allocation. For example, when the WTRU 104 is assigned with resources in the downlink for HSDPA, it may implicitly mean that specific resources are assigned in uplink for data and/or control transmission, (such as, ACK/NACK, small data packets, and a scheduling request for uplink transmission), The uplink data channel and the uplink control channel may have a fixed offset in time or frequency from the downlink, data channel or the downlink control channel, and the WTRU 104 may configure the uplink channels based on the fixed offset.

The Node-B 102 may make the decision regarding a transmit power, a packet size, a modulation scheme, a coding rate, and an H-ARQ process for uplink transmissions. In this case, the control information for uplink data packet is sent from the Node-B 102 to the WTRU 104 via the downlink control channel.

The WTRU 104 is required to monitor downlink control channel. If it is a time division multiplexing (TDM) system, the WTRU 104 may go to sleep during time slots that are not assigned to the WTRU 104 and may wake up to listen to the control channel on the assigned time slot(s).

Although the matures and elements of the present invention are described in the preferred embodiments in particular combinations, each feature or element can be used alone without the other features and elements of the preferred embodiments or in various combinations with or without other features and elements of the present invention.

The invention claimed is:

1. A method implemented by a wireless transmit/receive unit (WTRU), the method comprising:
   transmitting uplink control information, via an uplink control channel, on condition that an uplink data channel is not allocated to the WTRU for transmitting uplink data during a time transmission interval (TTI); and
   transmitting a combination of the uplink control information and uplink data, via the uplink data channel on condition that the uplink data channel is allocated to the WTRU during the TTI, wherein the uplink control information comprises physical layer control information.

2. The method of claim 1, wherein transmitting a combination of uplink control information and uplink data comprises: utilizing an uplink resource assignment for the uplink data channel.

3. The method of claim 1, further comprising: receiving, via a downlink control channel, an uplink resource assignment for the uplink data channel.

4. The method of claim 1, further comprising: transmitting a scheduling request via the uplink control channel.

5. The method of claim 1, wherein the uplink control information comprises multiple different types of control information.

6. The method of claim 1, wherein the physical layer control information comprises feedback information.

7. The method of claim 1, wherein the physical layer control information comprises a channel quality indicator (CQI).

8. The method of claim 1, wherein the physical layer control information comprises any of an acknowledgement and a non-acknowledgement.

9. The method of claim 1, wherein the combination of uplink control information and uplink data comprises: the uplink control information multiplexed with the uplink data.

10. The method of claim 1, wherein the physical layer control information comprises any of a channel quality indicator (CQI), an acknowledgement and a non-acknowledgement, and wherein the combination of uplink control information and uplink data comprises at least the CQI multiplexed with the uplink data.

11. A wireless transmit/receive unit (WTRU) comprising a transmitter, receiver and processor, wherein the transmitter is adapted to:
    transmit uplink control information, via an uplink control channel, on condition that an uplink data channel is not allocated to the WTRU for transmitting uplink data during a time transmission interval (TTI); and
    transmit a combination of the uplink control information and uplink data, via the uplink data channel on condition that the uplink data channel is allocated to the WTRU during the TTI, wherein the uplink control information comprises physical layer control information.

12. The WTRU of claim 11, wherein the transmitter is adapted to utilize an uplink resource assignment for the uplink data channel to transmit the combination of uplink control information and uplink data.

13. The WTRU of claim 11, wherein the receiver is adapted to receive, via a downlink control channel, an uplink resource assignment for the uplink data channel.

14. The WTRU of claim 11, wherein the transmitter is adapted to transmit a scheduling request via the uplink control channel.

15. The WTRU of claim 11, wherein the uplink control information comprises multiple different types of control information.

16. The WTRU of claim 11, wherein the physical layer control information comprises feedback information.

17. The WTRU of claim 11, wherein the physical layer control information comprises a channel quality indicator (CQI).

18. The method of claim 11, wherein the physical layer control information comprises any of an acknowledgement and a non-acknowledgement.

19. The WTRU of claim 11, wherein the combination of uplink control information and uplink data comprises: the uplink control information multiplexed with the uplink data.

20. The WTRU of claim 11, wherein the physical layer control information comprises any of a channel quality indicator (CQI), an acknowledgement and a non-acknowledgement, and wherein the combination of uplink control information and uplink data comprises at least the CQI multiplexed with the uplink data.

* * * * *